Jan. 12, 1971   G. K. WEAVER ETAL   3,553,812
BRAZABLE TERMINAL BODY AND APPARATUS FOR
INSTALLING SAME INSIDE A TUBE
Filed Aug. 23, 1968

INVENTORS
Galen K. Weaver
Howard A. Shaffer
BY Stephen A. Coughlin

ATTORNEY

United States Patent Office 3,553,812
Patented Jan. 12, 1971

3,553,812
BRAZABLE TERMINAL BODY AND APPARATUS
FOR INSTALLING SAME INSIDE A TUBE
Galen K. Weaver, 2606 Ridgewood Ave.; Howard A. Shaffer, 11505 Rockhill Ave. NE.; and Stephen A. Coughlin, 875 Hartshorn Ave., all of Alliance, Ohio 44601
Filed Aug. 23, 1968, Ser. No. 754,889
Int. Cl. B23k 19/00; H05k 13/00
U.S. Cl. 29—203                                                                5 Claims

ABSTRACT OF THE DISCLOSURE

A metal terminal body provided with an external coating of brazing material and a threaded portion for connecting the terminal body to a holding rod which is used for positioning and installing the terminal body, along with one or more conductor wires attached thereto, inside a metal tube. While held by the rod, the terminal body is braced against the tube wall at a selected location by means of a block inserted into the tube by means of another rod and which permits the block to be moved in sliding contact with the holding rod and the tube wall. The tube is externally heated to melt the brazing material on the terminal body to fuse same to the tube wall after which the block is withdrawn and the holding rod is disconnected from the terminal body.

BACKGROUND AND SUMMARY OF THE INVENTION

The present invention relates in general to the installation of thermocouple and voltage taps within metal tubes, and to a brazable terminal body useful in making such tap connections more particularly to a tube, and to an apparatus for installing such terminal bodies in tubes of relatively small diameter.

In the prior art, considerable difficulty has been encountered in installing thermocouple and voltage taps at locations deep inside tubes of small diameter, i.e. having inside diameters less than one-half inch. This difficulty is due to the fact that conventional tools cannot be used to make soldered or brazed connections of the taps to the tube wall at points greater than a few diameters distance from the end of the tube. As a result, the connection of such taps to the tube have been effected by means of spring loaded terminals which can be pushed into the tube and bear against its inside wall surface. These spring terminal connections have been found to be unsatisfactory in service because of intermittent or poor contact with the tube wall, and because the spring parts fail in high temperature applications.

The invention avoids these tap connection failure problems through the use of a metal terminal body that can be brazed to the tube wall after the thermocouple or voltage tap lead wires are connected to the terminal body prior to its insertion into the tube.

The terminal body provided with an external coating of brazing material, has a threaded portion for connecting it to the end of a holding rod that is used to insert the terminal body, along with the lead wires attached thereto, into the tube and to position the terminal body at the desired location within the tube.

While held by the rod, the terminal body is forced into contact with the tube inside wall by means of a block inserted into the tube by another rod, and the block is pushed to its desired location by said other rod in sliding contact with the terminal body holding rod and the tube wall.

The tube is externally heated to melt the brazing material on the terminal body so as to fuse same to the tube wall, after which the block and its associated rod are withdrawn and the holding rod is disconnected from the terminal body and also withdrawn.

By reason of the brazing, the terminal body is metallurgically bonded to the tube wall and provides a tap connection having both high thermal conductivity and high electrical conductivity, and which is not subject to deterioration by temperatures below the melting point of the materials employed.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS OF THE INVENTION

Figure 1:
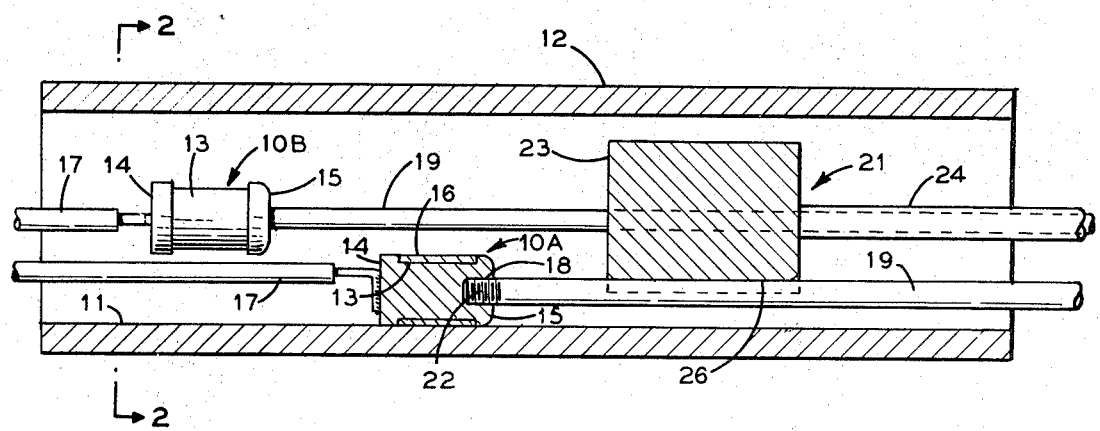
FIG. 1 is a longitudinal view, partly in section, of a tube, and showing a pair of terminal bodies according to a preferred embodiment of the insertion being installed inside the tube with the aid of the positioning apparatus of the invention.
Figure 2:
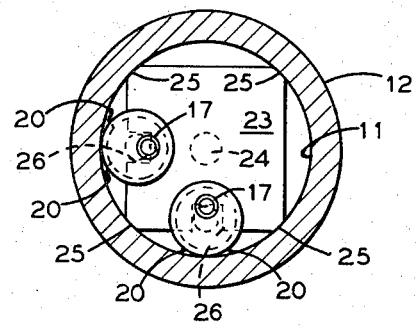
FIG. 2 is a transverse sectional view of the tube shown in FIG. 1 taken along line 2—2.

In FIGS. 1 and 2 there is shown a terminal body 10A that is positioned in contact with the inside wall surface 11 of a metal tube 12, and is ready to be brazed thereto, and also a terminal body 10B which has already been brazed to the tube surface 11.

According to a preferred embodiment of the invention, the terminal bodies 10A, 10B are made of metal, as for example steel, and are both of generally cylindrical shape with a reduced diameter section 13 located between their opposite end faces 14 and 15.

On this reduced diameter section 13 is applied a coating 16 of brazing material, as for example silver solder. As better seen on the unbrazed terminal body 10A, the coating 16 extends around the circumference of the section 13 and preferably covers its entire cylindrical surface with a thickness substantially equal to the difference in radii between the end portions of body 10A and the reduced diameter section 13.

The end face 14 of bodies 10A, 10B serves to accomodate the connection of one or more electrical conductor wires 17, such as for example the lead wires from a thermocouple junction or the lead wire of a voltage tap. The connection of such wires 17 to faces 14 is expediently made by welding or brazing. To assure that the wires 17 will not become disconnected from either body 10A, 10B during the brazing thereof to tube surface 11, the brazing material in the coating 16 is chosen so as to have a melting point that is lower than the melting point of the weld or braze used in connecting wires 17 to faces 14. Accordingly, the connection of wires 17 to faces 14 is made before the terminal bodies 10A, 10B are installed within tube 12 and also before the braze material coating 16 is deposited on the reduced diameter sections 13.

The other end face 15 has an axially extending internally threaded bore 18, as better shown in sectioned body 10A, that serves for releaseably connecting the body 10A, 10B to an associated holding rod 19 provided with a similarly threaded end 22.

If desired, the end face 14 of each body 10A, 10B can be drilled to provide a blind bore (not shown) extending axially toward the threaded bore 18, but not intersecting therewith, for the purpose of receiving the ends of the wires 17 that are to be welded or brazed to the body 10A, 10B.

To install the terminal bodies 10A, 10B inside of tube 12, a rod 19 is screwed into the bore 18 of each body 10A, 10B and with the aid of such rods 19, the bodies 10A, 10B are inserted into tube 12 and individually positioned as desired by manipulating their respective holding rods 19 to hold each body 10A, 10B in contact with the inside tube surface 11 at the location of the desired voltage or temperature measuring point.

To facilitate positioning of the terminal bodies 10A, 10B in good heat transfer contact with the tube wall, and to hold them in place until their braze connections thereto have solidified, the invention provides a brazing tool 21. The brazing tool 21 includes a heavy metallic block member 23 connected to the end of a ram rod 24. Block member 23 has a plurality of surfaces 25 positioned for sliding contact engagement with the tube surface 11 so that when inserted into tube 12, the surfaces 25 constrain block member 23 against radial movement relative to the axis of tube 12, while permitting said block member to freely move longitudinally inside the tube 12. In addition, block member 23 as shown has a pair of longitudinal grooves 26 positioned in angularly spaced relation to each other, for example, 90 degrees apart, as measured about the tube 12 axis. These grooves 26 are located and sized so as to encompass a corresponding rod 19 in sliding contact engagement therewith. Accordingly, the grooves 26 maintain the rods 19 and the terminal bodies 10A, 10B to which they are connnected in generally parallel relation to the tube 12 axis, and in predetermined angular spacing thereabout.

With the terminal bodies 10A, 10B positioned by rods 19 and retained in position by bracing tool 21, the tube 12 is then externally heated at the contact regions until the brazing material coating 16 melts and flows by capillary action into the interstices 20 between the bodies 10A, 10B and tube 12 to fuse them to the tube surface 11. As shown in the drawing, the terminal body 10B has already been fused to tube surface 11, and it will be appreciated that after the brazing operation is completed for the body 10A, it will have substantially the same external appearance as terminal body 10B.

It will be appreciated by the artisan that by using rods 19 to position terminal bodies 10A, 10B inside tube 12, it is possible to control the axial distance of each body 10A, 10B from the tube 12 end, as well as the angular position of each body 10A, 10B about the tube 12 axis, with relatively high precision since the required axial insertion distance in each case can be measured and marked off on the rod 19, and the angular position of the body 10A, 10B can be readily gauged from where the rod 19 extends out of the tube 12.

After the braze connections of terminal bodies 10A, 10B have cooled, block member 23 is withdrawn from tube 12 and the rods 19 are unscrewed and removed from tube 12.

It should be noted that in the specific embodiment of the invention presented herein, the block member 23 is provided with two rod guide grooves 26 merely as an example to show how the apparatus of the invention can be utilized for installing a plurality of brazeable terminal bodies 10A, 10B in a single set-up operation. The artisan will readily appreciate that the total number of grooves 26 provided in block member 23, the angular spacing between grooves 26, and the number of grooves 26 actually used can vary as circumstances dictate.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features

What is claimed is:

1. An apparatus for positioning a terminal body within a tube and in contact with the inside surface thereof, which comprises an elongated rod means disposed for connection at one end to the terminal body to hold and insert same into tube; and a block disposed for insertion into said tube and for movement longitudinally therein in sliding contact with both the inside surface of the tube and said rod means to press the terminal body held thereby against the inside surface of the tube.

2. An apparatus according to claim 1 wherein said block has a longitudinal groove positioned for sliding contact engagement with said rod means to align same generally parallel to the axis of the tube.

3. An apparatus according to claim 2 wherein said block has a plurality of surfaces positioned for sliding contact engagement with the tube and arranged to constrain said block against radial movement relative to the tube axis.

4. An apparatus according to claim 3 wherein said block has a plurality of longitudinal grooves positioned in angularly spaced-apart relation to each other.

5. An apparatus according to claim 3 including a rod connected to said block for moving same within the tube.

References Cited

UNITED STATES PATENTS 3,417,458   12/1968   Lob et al. _____ 29—203X

THOMAS H. EAGER, Primary Examiner

U.S. Cl. X.R.

228—44